United States Patent
Italia et al.

(10) Patent No.: US 6,792,111 B1
(45) Date of Patent: Sep. 14, 2004

(54) CRYPTATION SYSTEM FOR PACKET SWITCHING NETWORKS BASED ON DIGITAL CHAOTIC MODELS

(75) Inventors: Francesco Italia, Catania (IT); Luigi Fortuna, Syracuse (IT); Francesco Beritelli, Catania (IT); Eusebio Di Cola, Messina (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/416,321

(22) Filed: Oct. 12, 1999

(30) Foreign Application Priority Data

Oct. 12, 1998 (EP) ............................................. 98830601

(51) Int. Cl.[7] .......................... H04L 9/00; H04N 7/167; H04K 1/00
(52) U.S. Cl. ......................... 380/263; 380/45; 380/206; 380/209; 380/257; 713/160; 713/201
(58) Field of Search ................................. 380/263, 206, 380/209, 257, 45; 713/160, 201

(56) References Cited

U.S. PATENT DOCUMENTS

| | | | | |
|---|---|---|---|---|
| 5,048,086 A | * | 9/1991 | Bianco et al. | 380/28 |
| 5,365,589 A | * | 11/1994 | Gutowitz | 380/43 |
| 5,479,513 A | * | 12/1995 | Protopopescu et al. | 380/28 |
| 5,729,607 A | * | 3/1998 | DeFries et al. | 380/263 |
| 5,857,025 A | * | 1/1999 | Anderson et al. | 380/28 |
| 6,101,602 A | * | 8/2000 | Fridrich | 713/176 |
| 6,154,839 A | * | 11/2000 | Arrow et al. | 713/154 |
| 6,212,239 B1 | * | 4/2001 | Hayes | 375/259 |
| 6,587,563 B1 | * | 7/2003 | Crandall | 380/263 |

FOREIGN PATENT DOCUMENTS

| | | |
|---|---|---|
| EP | 0 467 239 A2 | 7/1991 |
| JP | 09288565 | 11/1997 |
| JP | 10020783 | 1/1998 |

OTHER PUBLICATIONS

Kotulski et al., Discrete Chaotic Cryptography, Jan. 13, 1997, 381–394, Polish Academy of Sciences, Institute of Fundamental Technological Research, PL–00–049 Warszawa Swietokrzyska 21, Poland.

* cited by examiner

*Primary Examiner*—Ayaz Sheikh
*Assistant Examiner*—Kambiz Zand
(74) *Attorney, Agent, or Firm*—Lisa K. Jorgenson; Allen, Dyer, Doppelt, Milbrath & Gilchrist, P.A.

(57) ABSTRACT

A cryptation system for information transmitted through packet switching networks masks the digital information data by combining it at the transmitting station with digital data of a certain cryptation code before transmitting the so-encrypted data through the network. The system also performs an inverse decrypting processing at the receiving station using the same code. The system generates at a transmitting station and at a receiving station, starting from a given pair of password codes or user key, a certain discrete chaotic model or map of the pair of codes or key, producing dynamically updated pairs of values of codes or keys every certain number of processing steps of the chaotic map. The data to be transmitted is masked by way of a logic combination with the current dynamically updated keys at the transmitting station. The data is demasked at the receiving station by way of a logic decomposition of the digital data from the current dynamically updated key thereby returning the digital data to a normal non-encrypted condition.

10 Claims, 7 Drawing Sheets

MASKING WITH CHAOTIC KEY OF THIRD LAYER

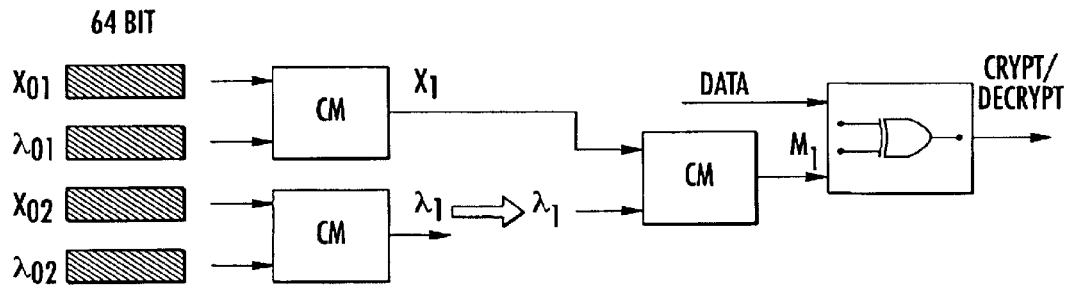
FIG. 3a MASKING WITH CHAOTIC KEY OF SECOND LAYER
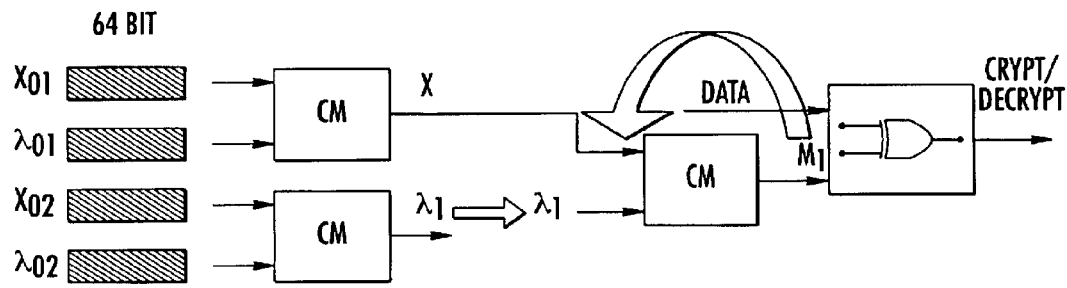
FIG. 3b STATE EVOLUTION
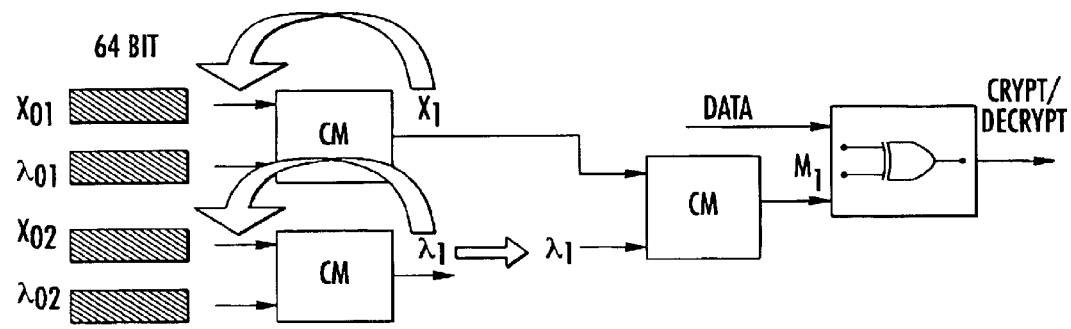
FIG. 3c PARAMETER CONTROL EVOLUTION

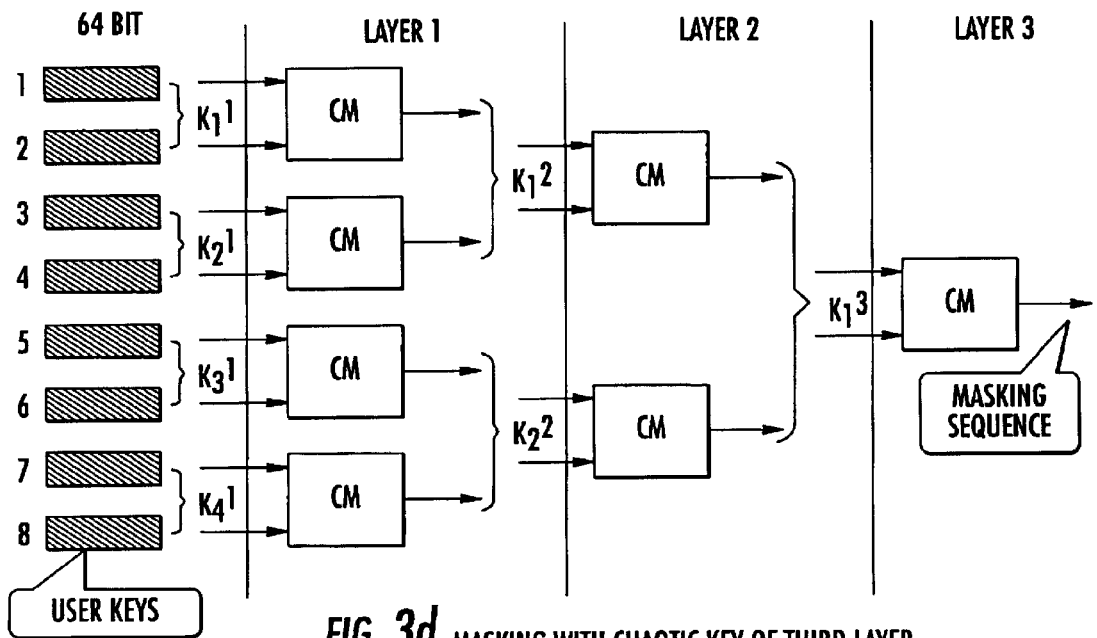
FIG. 3d MASKING WITH CHAOTIC KEY OF THIRD LAYER
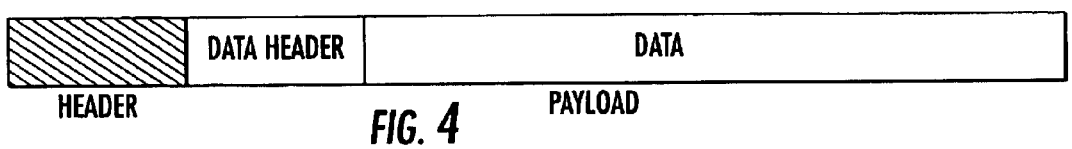
FIG. 4
| PID (16 BIT) | SID (16 BIT) | MID (8 BIT) | CC (12 BIT) | SL (4 BIT) | HL (8 BIT) | PL (16 BIT) |
FIG. 5

| LAYER CH.1 | LAYER CH.2 | LAYER CH.3 | LAYER CH.4 | ...... | LAYER CH.16 |
|---|---|---|---|---|---|
| LAYER CH.17 | LAYER CH.18 | LAYER CH.19 | LAYER CH.20 | ...... | LAYER CH.32 |
| LAYER CH.33 | LAYER CH.34 | LAYER CH.35 | LAYER CH.36 | ...... | LAYER CH.48 |
| LAYER CH.49 | LAYER CH.50 | LAYER CH.51 | LAYER CH.52 | ...... | LAYER CH.64 |
| LAYER CH.65 | LAYER CH.66 | LAYER CH.67 | LAYER CH.68 | ...... | LAYER CH.80 |
| LAYER CH.81 | LAYER CH.82 | LAYER CH.83 | LAYER CH.84 | ...... | LAYER CH.96 |
| LAYER CH.97 | LAYER CH.98 | LAYER CH.99 | LAYER CH.100 | ...... | |

*FIG. 12*

CRYPTATION SYSTEM FOR PACKET SWITCHING NETWORKS BASED ON DIGITAL CHAOTIC MODELS

FIELD OF THE INVENTION

The present invention relates to electronics and communications, and, more particularly, to a method and relative system architecture for encrypting data transmitted on data networks.

BACKGROUND OF THE INVENTION

The growing development of networks and broadband telecommunication services and, particularly of pay services, and the growing demand for increasingly high security standards for the privacy of the data transmitted have dictated a strong need for data encrypting systems and algorithms. Among the most important applications are the encrypting of video transmission for pay TV services, of telephone conversations through mobile radio systems, and of data transmitted on a telecommunications network (electronic signatures, telecommunications bank operations, trading, and the like).

Typically, telecommunication networks supporting these services are broadband networks whose success is due to new network technologies and, in particular, to the flexibility of communication protocols (for example X.25, IP, ATM) based on the so-called packet switching techniques. The packet switching technique is based on the segmentation of the information to be transmitted into the form of packets of digital data of adequate length depending on the needs, to which address data (header) are associated for the information to reach its destination. With these techniques of transmission, the band is occupied only in presence of data traffic to be transmitted and different communications of different types of traffic may co-exist on a unique carrier.

If on one hand the Internet Protocol (IP) is emerging as the platform network with greater growth prospects, on the other hand the advent of new systems and broadband media (optical fibers and coaxial cables) represent a concrete premise for offering to the users a wealth of new services based on the ATM technique (Asynchronous Transform Mode). In the future, the combination of service platforms, such as Internet with the ATM transport technique, may also contribute to accelerate the use of applications based on the ATM technique.

In this scenario, security is becoming a primary requirement for all operators of the sector because telecommunications services are on the increase (home banking, virtual shopping, electronic trading, etc.) and they require a high degree of privacy of information. FIG. 1 shows the functional scheme of a secure communication system which highlights the presence of encrypting (CRYPT) and decrypting (CRYPT$^{-1}$) blocks for data protection. The encrypting block CRYPT at the transmitter station encrypts the messages (clear text) commonly through a password function, so that only authorized persons can retrieve the original message. The output of the encrypting (encoding) process, called ciphered text, is decrypted (decoded) at the receiver station by way of an enciphering password.

It has been noticed that methodologies based on chaos theory may be useful in cryptation techniques. Potentially they are much more undecryptable than traditional cryptation techniques (DES, RSA, IDEA, MD5, etc.) presently used in packet switching networks.

A starting point for the creation of chaotic cryptation systems are the so-called chaotic models. These, regardless of the meaning and the problems related to their development, are recursive systems which given certain initial values, indefinitely evolve in time in a complex and unpredictable manner. The following table indicates some of the most common discrete chaotic models (also referred to as maps).

TABLE 1

Main chaotic maps

| CHAOTIC MAP | FUNCTION |
|---|---|
| Logistic map | $X_{n+1} = aX_n(1 - X_n)$ |
| Henon map | $X_{n+1} = 1 - aX_n^2 + Y_n$ |
|  | $Y_{n+1} = bX_n$ |
| Logarithmic map | $X_{n+1} = \ln(a|X_n|)$ |
| Squared map | $X_{n+1} = a - X_n^2$ |
| Cubic map | $X_{n+1} = Y_n$ |
|  | $Y_{n+1} = aY_n - Y_n^3 - bX_n$ |

Each chaotic series is characterized by the relative key, that is by the values of the initial state x(0) and of the control parameters (parameters a and b). Generally, to encrypt the stream of digital data without increasing the amount of transmitted information, the most appropriate approach to protect the information is that of masking, as shown in the example of FIG. 2.

According to this approach, the transmitted data are masked by hiding the information signal within a more complex one, generated by a chaotic system, by simply adding the two types of data. During the reception phase, the opposite operation must be carried out, that is discriminating between the received data and the information to be locally reconstructed through a system identical to that used for the transmission.

The delicate problem of synchronization which is addressed herein, is independent of the choice of a particular chaotic map. Reliability and the very high level of security are the main advantages of chaotic cryptography. Starting from different parameters, it is impossible to obtain two identical series even if the starting parameters differ very little. This is an intrinsic characteristic of chaotic systems.

The following technical papers relate to the problem of cryptation systems for packet switching networks.

(1) B. Schneier, Applied cryptography—Protocols, Algorithms and Source Code in C, John Wiley & Sons, 1994.

(2) D. R. Frey, Chaotic Digital Encoding: An Approach to Secure Communication, IEEE Trans Circuits Syst.—Part II, vol. 40, no. 10, pp. 660–666, 1993.

(3) M. J. Ogorzalek, Taming Chaos: Part I—Synchronization, IEEE Trans Circuits Syst.—Part I, vol. 40, no. 10, pp. 693–6699, 1993.

(4) G. Kolumb (n, M. P. Kennedy and L. O. Chua, The Role of Synchronization in Digital Communications Using Chaos—Part I: Fundamentals of Digital Communications, IEEE Trans Circuits Syst.—Part I, vol. 44, no. 10, pp. 927–936, 1997.

(5) F. Dachselt, K. Kelber and W. Schwarz, Chaotic Coding and Cryptoanalysis, Proceedings of ISCAS '97, pp. 1061–1064, 1997.

(6) William Stallings, "IPv6: The New Internet Protocol", IEEE Communications Magazine, July 1996, pp. 96–108.

SUMMARY OF THE INVENTION

In view of the foregoing background, it is an object of the invention to provide for a cryptography system based on digital chaotic models with enhanced security based on an encrypting/decrypting symmetric system, employing a key that is dynamically updated by the chaotic system.

According to a preferred embodiment of the invention, the dynamic key continuously processed by a certain model or digital chaotic map, used for encrypting/decrypting the information symmetrically at the transmitter and at the receiver, is generated through a multilevel architecture. This provides for a scaleable degree of security, depending on the user's needs. A higher degree of security can be obtained at the expense of an increment of the time taken for encrypting/decrypting.

The method of the invention, considers the organization of packets of crypted data with a header of data having a predefined and constant length, and with a payload of a variable length containing the crypted information.

BRIEF DESCRIPTION OF THE DRAWINGS

FIG. 3a shows a cryptography scheme of the invention with a second level key.

FIG. 3b shows the chaotic evolution of the state, referred to the scheme of FIG. 3a.

FIG. 3c shows the chaotic evolution of the control parameter, referred to the scheme of FIG. 3a.

FIG. 3d shows a cryptography scheme of the invention with a third level key.

FIG. 4 shows the complete structure of a packet of crypted data.

FIG. 5 is a detail of the header.

FIG. 12 shows the organization of the RAM memory of the cryptography module.

DETAILED DESCRIPTION OF THE PREFERRED EMBODIMENTS

Figure 1:
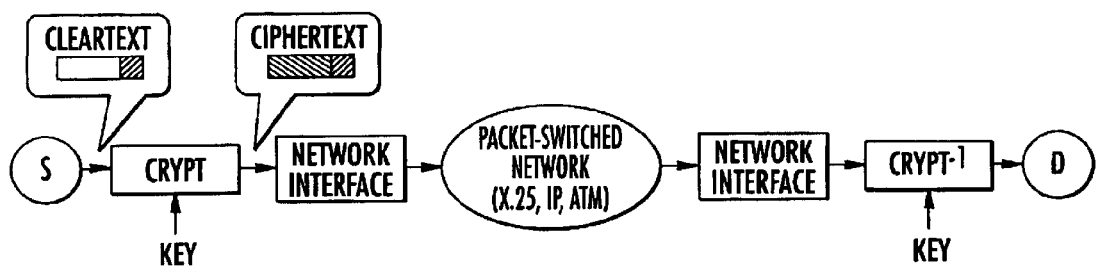
FIG. 1 is the scheme of a cryptation system for packet switching transmission networks as in the prior art.
Figure 2:
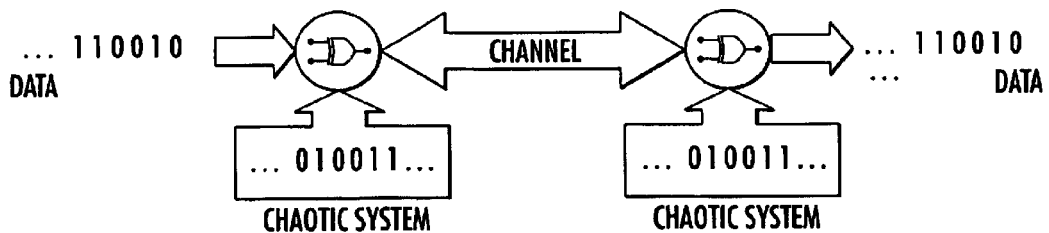
FIG. 2 is a scheme of cryptography based on a chaotic masking as in the prior art.

The key used for the masking sequence includes two elements or codes: State (64 bits) and Control parameter (64 bits). The combination of these two elements provides the key which permits decrypting the crypted message or to encrypt a message.

The system of the invention is based on a symmetrical cryptography algorithm with a dynamic key of a chaotic type. In particular, the system dynamically updates both the State and the Control parameters of the chaotic series or map that is used for masking the information. Even the laws of updating the initial State and Control parameters, or of the plurality of such elements in case of a scaleable multilevel scaleable implementation of the method of the invention, are of the chaotic type.

In practice, the user has at his disposal a double key, including four 64 bit codes, of which the first two represent the Control parameter and the initial State for which a chaotic series evolves generating a succession of Control parameters:

$$c(0), c(1), c(2), \ldots$$

the remaining two codes, represent instead the control parameter and the initial State from which a chaotic series evolves generating a succession of initial States:

$$x(0), x(1), x(2), \ldots$$

By way of an example, according to the scheme of FIG. 3a, the above mentioned two successions may be obtained in the following manner. Initially, the chaotic function is applied to the first key, formed by the two codes $X_{01}$ $\lambda_{01}$, thus obtaining the State parameter $X_1$. The same chaotic function is applied to the second key, formed by the two codes $X_{02}$ $\lambda_{02}$, thus obtaining the Control parameter $\lambda'_{01}$. However, the latter will range between 0 and 1 and to assure that the Control parameter is between 3.5 and 4 will be sufficient to apply a function capable to shift it within this interval. A very simple function that performs such a shift is:

$$\lambda_{01} = \lambda'_1 \text{ OR } (D4000\ 0000\ 0000\ 0000)H$$

The masking value $M_1$ may be derived by applying the chaotic function to $\lambda_1$ and $X_1$. To encrypt or decrypt the datum $D_1$ it is sufficient to carry out an EXOR function or any other type of logic combination between the so generated masking value $M_1$ and the datum $D_1$.

The successive masking value $M_2$ with which encrypts the datum $D_2$ is obtained by applying the chaotic function to $\lambda_1$ and to $M_1$. Similarly $M_3$ will be obtained by applying the chaotic function to $\lambda_1$ and to $M_2$, and so forth.

When there is a need to evolve the map related to the control parameter, the chaotic function is applied to $X_1$ and to $M_1$, thus obtaining the state $X_2$. The same chaotic function is applied to $\lambda'_1$ and $\lambda_{02}$, thus obtaining the control parameter $\lambda'_2$ which may be shifted to the appropriate range by the single function $\lambda_2 = X'_2$ OR (D4000 0000 0000 0000)H.

A new masking value will be defined by applying the chaotic function to $\lambda_2$ and $\lambda_2$. It should be noted that the masking value is between 0 and 1. Therefore, its 64 bit corresponding value will have the two most significant bits at 0 (this originates from placing by way of example $2^{62}=1$). This could impede the masking of the two most significant bits of the datum to be crypted. The problem may be solved simply by copying (only for the masking phase) the two bits of weight 60 and 61 into the two most significant bits or in any case giving to these two bits (63, 64) any casual values.

Scaleable Multilevel Chaotic Key

It is possible to further generalize the algorithm of the invention for generating the keys that govern the dynamic masking of the information, by implementing a scaleable multilevel key generation architecture. As depicted in FIG. 3b, the initial State and the Control parameters of the nth stage are generated in the preceding stage with a chaotic law. This has two advantages: 1) the system has a scaleable security degree; and 2) the output masking sequence has an enhanced unpredictability.

Of course, with a multilevel structure, it will be necessary to account either for an increment of the processing time, in case of a sequential implementation of the entire multilevel architecture, or for an increment of the required silicon area in case of a parallel implementation of the multilevel architecture. Hence, the selection of the degree of security may be conditioned in some cases by speed requirements of data processing of the particular application.

More generally, the scaleable multilevel architecture may be structured as a unique processing block receiving as an input, besides the key of cryptation, also the desired security level for the specific application. Naturally, the dynamic range of the CM block output signals, which will be used in the successive stage, must be adapted to be appropriate as a Control parameter in the successive stage. In the case of a logistic map, this adaptation may be done by implementing an OR between the CM block output which processes the map and the hexadecimal value D400 0000 0000 0000.

Definition of the Crypted Packet

According to a preferred embodiment of the invention, a new crypted packet (CRYPT packet) structure provided by a header of data having a constant length and of a payload of variable length is defined as shown in the example of FIG. 4. Naturally, the packet will include the packet header (indicated with a dark tone shading in the figure) according to the particular communication protocol being used.

The header of the crypted data packets contains a series of fields which are useful during the encrypting of the information. The data header includes a first packet identifying field (PID) and a second field (SID) that identifies the data stream to which the packet belongs (for those applications based on the transmission of a plurality of different streams). Moreover, in those cases wherein it is possible to structure the information in messages, that is in groups of CRYPT packets of a constant length, a third field (MID) identifying the message to which the packet belongs and a fourth field (CC) carrying information on the progressive number (continuity counter) of the packet within the message, may be also present.

In such a case, the crypting may be done at the message level, that is for each new message there is a change of key. Where the processing preceding the encrypting provides for already packeted data, the length of the header (HL) of the packeted data is indicated to prevent that such a header be encrypted. Finally, a field indicating the payload length of the crypted packet (PL) may be included for applications where it is necessary to account for a payload of variable length. Since the loss of a portion of a crypted packet signifies the loss of the entire packet, it is convenient to choose a PL value not excessively large. Of course, on the other hand, there is a need to guarantee a certain minimum length of the packet so that the ratio overhead of header/payload data will be as small as possible.

FIG. 5 shows the organization of the data header according to an embodiment of the invention. The data header of the crypted packet is subdivided into the following fields:

PID (Packet IDentifier) is an identifier which permits appropriately identifying the packet as a CRYPT packet.

SID is the identifier of the stream (i.e. a filmed sequence) to which the packet belongs. It implicitly permits establishing when the encrypting of a certain stream should stop and encrypting of another stream should start.

MID (Message IDentifier) is the unique identifier of the message to which the packet belongs. It implicitly permits establishing when a change of key should be done.

CC (Continuity Counter) indicates the number of the packet within the message. It permits, during the reception phase, detecting an eventual loss of packets because during the transmission it is incremented one unit at the time.

SL (Security Level) indicates the chosen security level of protection of the information.

HL (Header Length) indicates the length in bytes of the header of the packet of data header contained in the payload. For certain types of data, headerless data, its value will be 0.

PL (Payload Length) indicates the length in bytes of the payload of the crypted packet. It serves to maintain the synchronism in case of a loss of crypted packets.

The peculiarities and advantages of the system of the invention may be summarized as follows:

The algorithm has a high level of security. The chaotic models, belonging to the class of polyalphabetical ciphers, ensure a higher degree of security than monoalphabetic ciphers (for example DES). Moreover, the dynamic change of key increases even further the level of security provided by the system of the invention. The law according to which the key is dynamically updated is of the chaotic type too and the frequency of updating may be chosen taking into consideration the characteristics of the particular application. Finally, to prevent cryptation of essential communication data and facilitate the use of the cryptation system, the masking is applied only to the data field (payload) of the packet. The HL field included in the header of the crypted packet permits a correct synchronization, preventing cryptation of the header portion of the packets.

According to a preferred embodiment, the level of security is scaleable. A multilevel architecture, by employing the same hardware, can readily adapt the level of security to the specific application requirements.

The algorithm exploits the intrinsic synchronism of the communication protocol based on the packet switched technique. During reception, by analyzing eventual discontinuities in the MID or CC fields, it is possible to trace back the number of the lost crypted packets.

The definition of the cryptography protocol provides for a certain flexibility also in the selection of the layer of application of the cryptography block. The structure of the crypted packet is very flexible. It is capable of managing data streams of variable lengths with or without header.

The decrypting algorithm is independent of the particular type of information transmitted (audio, video, data) and of the eventual processing undergone by the messages (compression, etc.).

Figure 6:
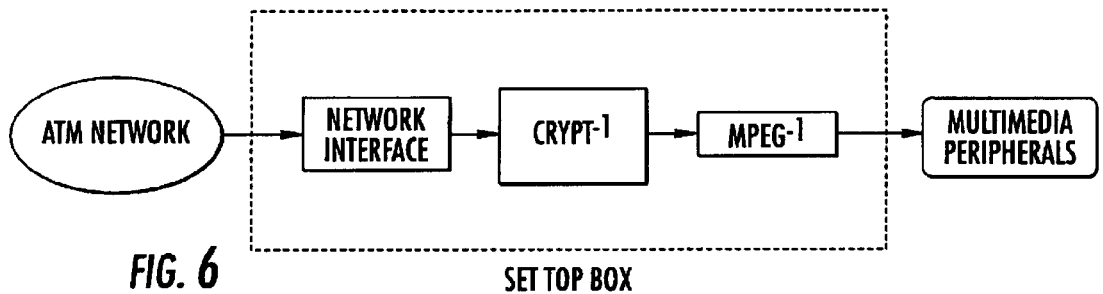
FIG. 6 is a secure communication scheme for MPEG sequences transmitted on an ATM network.

Application of the Algorithm of the Invention to MPEG Transmission on ATM Networks The application taken into consideration by way of example is that of a secure system of communication for MPEG video sequences transmitted on an ATM network. The encrypting/decrypting architecture of the invention may be integrated in a VLSI device of a functional hardware system, such as, for example, a Set Top Box for multimedia applications, as schematically illustrated in FIG. 6.

In terms of digital data, an MPEG video may be seen as a sequence of bits (bitstream). In particular, at the co-decoding level, that is at the coder output and at the decoder input, an MPEG film is delimited by sequence limiters. It always begins with a header, which contains essential coding information, such as, for example: the frame size and the rate at which they are transmitted and the bit-rate, and terminates with a 32 bit end of sequence indicator.

The header is followed by a variable number of groups of frames, called GOP (Group of Pictures). These provide for a random access to the pictures and represent the smallest entity that may be independently decoded. A GOP always begins with a header and terminates in correspondence with the header of the successive GOP or with the end of sequence indicator.

Figure 7:
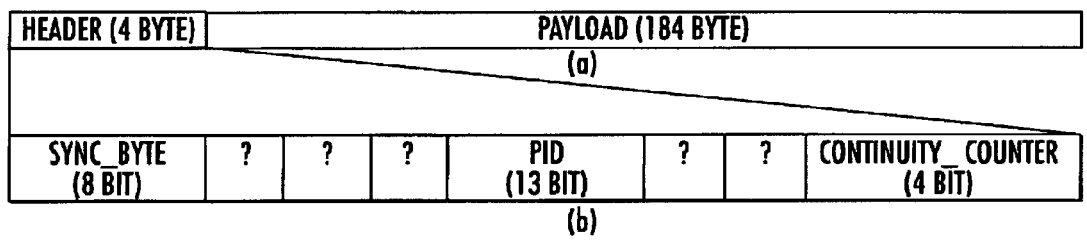
FIG. 7 shows the known structure of an MPEG-TS (a) packet and a detail of the 4 byte header of the MPEG-TS (b) packet.

At transmission level, the MPEG bitstream is structured in MPEG packet Transport Streams (MPEG-TS) formed of a 4 byte header and a data field of 184 bytes, according to the scheme of FIG. 7. Typically, the header of a MPEG-TS packet has eight data fields containing: the synchronizing byte (SYNC_BYTE), the identifier of the stream to which it belongs (PID) and the continuity counter (CONTINUITY_COUNTER) which, comprising only 4 bits, zeroes itself every sixteen MPEG-TS packets.

Figure 8:
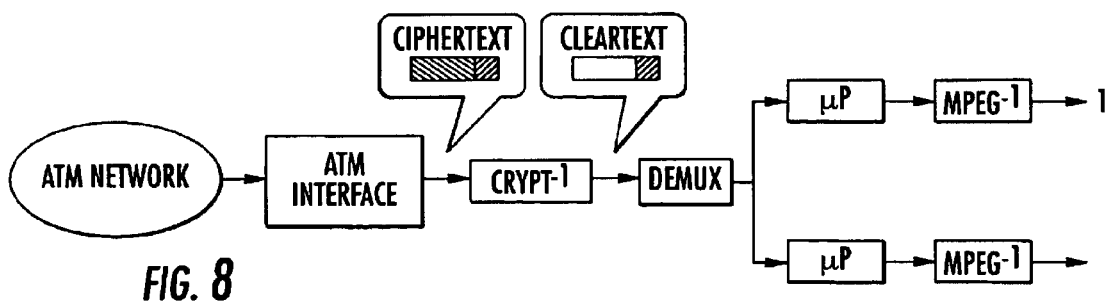
FIG. 8 shows a decoding system of MPEG sequences received through an ATM network.

FIG. 8 shows a functional diagram of the case of a de-coder of MPEG sequences transmitted on an ATM network. The network interface reorders and reassembles the ATM packets received. In case of a simple unencrypted MPEG stream, it returns the transport level structured information, that is in packets of 188 bytes organized according to the MPEG-2 Transport Stream format (MPEG-TS) shown in FIG. 7. The microprocessors μP return the different MPEG streams from the transport level to the coding level. Another microprocessor, not shown in the figure, finally carries out the MPEG decoding operations. In case of errors or loss of ATM packets, the ATM interface discards the entire MPEG-TS packet and thereafter the μP effect a further test discarding packets eventually received with errors.

By way of example of an application, the cryptography block of the invention may be inserted at the transport level, for imposing a unique de-crypting system for all the streams. This reduces the costs, the size and the complexity of the related hardware architecture.

Figure 9:
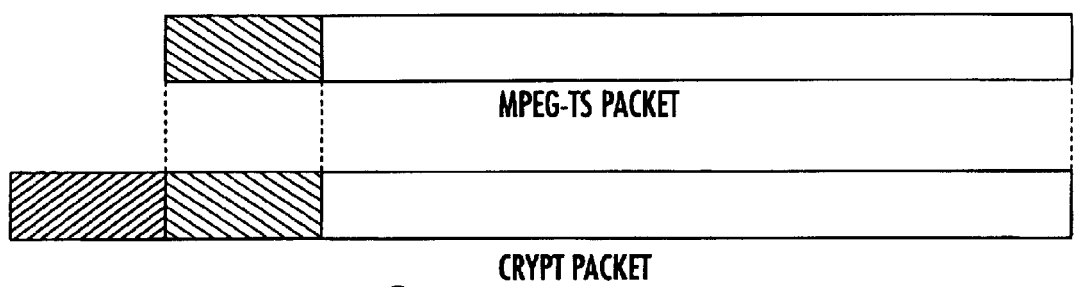
FIG. 9 shows the make up of a corresponding crypted packet according to the present invention.

The cryptography system introduces information data within the payload of the crypted packet and sets the values of the relative header, as illustrated in FIG. 9. During a reception phase, the CRIPT$^{-1}$ block performs the inverse operation (decrypting), returning the data to a transport level format.

Figure 10:
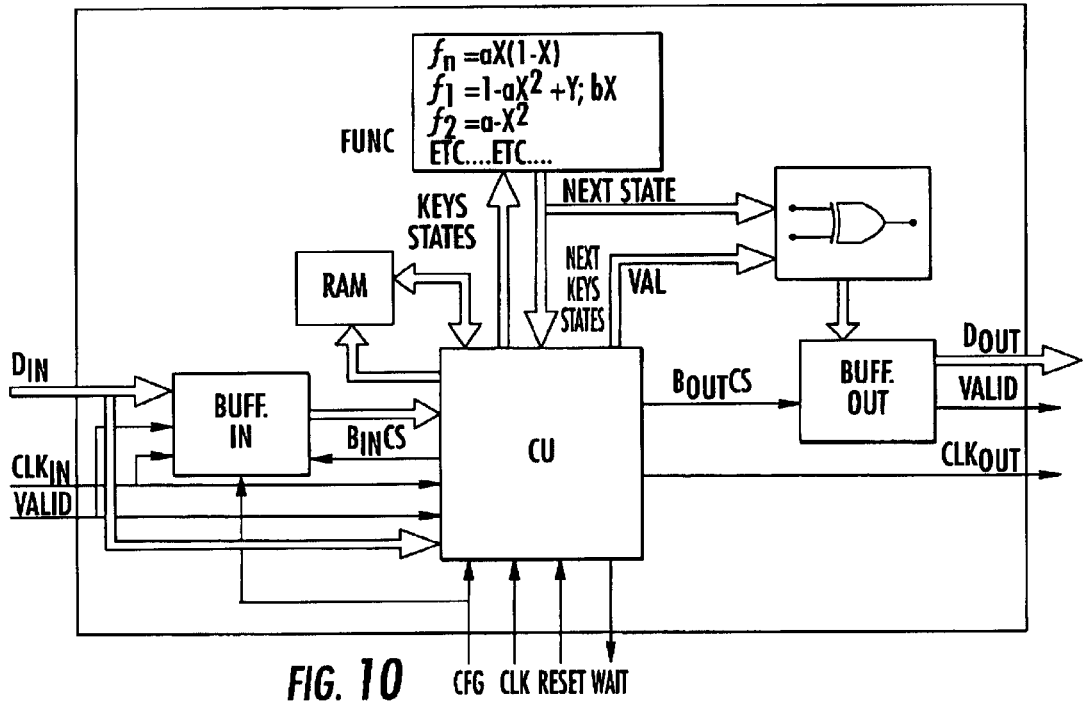
FIG. 10 shows the architecture of the cryptography model according to the invention.

Since at the transport level the MPEG-TS packets may be multiplexed and may belong to different data streams, it is necessary to store the State of the chaotic map of each stream. FIG. 10 shows a hardware architecture for the cryptography model of the invention. The system comprises an input buffer Buff.IN, that serves to store a certain number of data which must be crypted or decrypted, an output buffer, Buff.OUT, in which the data are stored after having been crypted or decrypted. There is also a processor unit, CU, that analyzes the data stored, and controls whether the data are crypted or not, etc.

A FUNC module generates the selected chaotic function. A RAM stores the values necessary to the crypting/decrypting operations, such as, for example, the present State and the key State for each channel, the security level to be used for each channel, etc. The system also includes a module that performs the sum or the difference between the masking digital sequence and the data contained in the payload.

Figure 11:
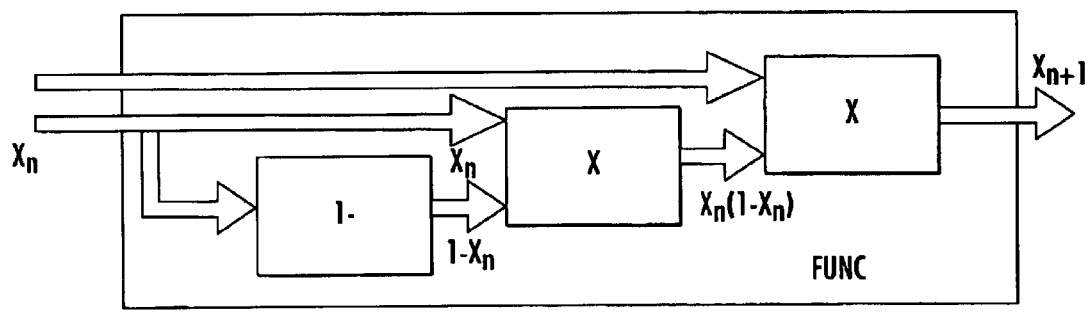
FIG. 11 is a detail of the FUNC module of the architecture of FIG. 10.

As shown in FIG. 11, the FUNC module may be provided by basic cells executing the elementary operations. For example, in the case of the chaotic function that generates the logistic map, the FUNC module may comprise two multipliers, X, and a module, 1−, which executes the operation 1 minus the value present at the input of the module.

The RAM includes an array of elementary memory cells organized in a way to form a 64 bit memory per each address. The required RAM capacity is calculated as a function of the maximum security level and the maximum number of channels; for example:

| Password or key | Security level | Registers per channel | Memory Capacity |
|---|---|---|---|
| 2 × 64 bit | 1 | 1 | 800 byte (100 channels) |
|  |  |  | 400 byte (50 channels) |
| 4 × 64 bit | 2 | 3 | 400 byte (100 channels) |
|  |  |  | 1200 byte (50 channels) |
| 8 × 64 bit | 3 |  | 5600 byte (100 channels) |
|  |  |  | 2800 byte (50 channels) |
| 16 × 64 bit | 4 | 15 | 12000 byte (100 channels) |
|  |  |  | 6000 byte (50 channels) |

Beside the information inherent to the different States and to the current Keys relative to each Channel, the RAM contains data for allowing the CU to recognize the security level that must be used for each channel. In the example, 4 bits are used to define the security level for each channel. If there are 100 channels, besides the processing data area a further data storage areas for about 56 bytes must be accounted for.

The CU module is programmable. When the cfg pin is activated (such as, for example, after a reset) the data acquisition will not be interpreted as data to be crypted or decrypted. Instead they will be configuring data (for example, setting the security level for each channel, etc.).

Computing Aspects

By way of example, the operations necessary to encrypt a whole PES packet in case a security level of up to level 2 and a logistic chaotic function are chosen, are reported in the following tables.

Let:

$X_{ki}$=the initial State relative to the kth chaotic map of the ith level;

$C_{ki}$=the Control parameter relative to the kth chaotic map of the ith layer;

A=register of the present State of the chaotic map;

B=register of the Control parameter of the chaotic function;

F=the chaotic function output;

$L_{ik}$=register storing the relative output of the k-th chaotic map of the ith layer;

C=register storing the output of the chaotic function;

D=register storing the datum to be crypted;

S=register storing the result of the masking sum/subtraction.

| STEP | OPERATION | NUMBER OF CYCLES |
|---|---|---|
| 0 | PES ACQUISITION | (188 + 16 )*2 |
| 1 | CALCULATION RAM ADDRESS CONTAINING THE NUMBER OF LEVELS OF THE CURRENT CHANNEL | MAX 10 |
| 2 | READING N° OF LEVELS FROM THE RAM | 2 |
| 3 | PROCESSING THE DATUM RELATIVE TO THE N° OF LEVELS | 4 |
| 4 | READ X11 FROM RAM | 2 |
| 5 | X11 => A | 1 |
| 6 | READ C11 FROM RAM | 2 |
| 7 | C11 => B | 1 |
| 8 | STORE F IN RAM (L11) | 2 |
| 9 | READ X21 FROM RAM | 2 |
| 10 | X21 => A | 1 |

-continued

| STEP | OPERATION | NUMBER OF CYCLES |
|---|---|---|
| 11 | READ C21 FROM RAM | 2 |
| 12 | C21 => B | 1 |
| 13 | STORE F IN RAM (L21); F => B | 2 |
| 14 | READ L11 FROM RAM | 2 |
| 15 | L11 => A | 1 |
| 16 | STORE F IN RAM (L12); F => C; DATUM => D | 2 |
| 17 | S => OUT (FIRST DATUM) | 8*2 |
| 18 | F => B | 1 |
| 19 | STORE F IN RAM (L12); F => C; DATUM => D | 2 |
| 20 | S => OUT (SECOND DATUM) | 8*2 |
| 21 | F => B | 1 |
| 22 | STORE F IN RAM (L12); F => C; DATUM => D | 2 |
| 23 | S => OUT (THIRD DATUM) | 8*2 |
| 24 | PES ACQUISITION | (188 + 16 )*2 |
| 25 | CALCULATION RAM ADDRESS CONTAINING THE NUMBER OF LEVELS OF THE CURRENT CHANNEL | max 10 |
| 26 | READING N° OF LEVELS FROM THE RAM | 2 |
| 27 | PROCESSING THE DATUM RELATIVE TO THE N° OF LEVELS | 4 |
| 28 | READ X11 FROM RAM | 2 |
| 29 | X11 => A | 1 |
| 30 | READ C11 FROM RAM | 2 |
| 31 | C11 => B | 1 |
| 32 | STORE F IN RAM (L11) | 2 |
| 33 | READ X21 FROM RAM | 2 |
| 34 | X21 => A | 1 |
| 35 | READ C21 FROM RAM | 2 |
| 36 | C21 => B | 1 |
| 37 | STORE F IN RAM (L12); F => B | 2 |
| 38 | READ L11 FROM RAM | 2 |
| 39 | L11 => A | 1 |
| 40 | STORE F IN RAM (L12); F => C; DATUM => D | 2 |
| 41 | S => OUT (FIRST DATUM) | 8*2 |
| 42 | F => B | 1 |
| 43 | STORE F IN RAM (L12); F => C; DATUM => D | 2 |
| 44 | S => OUT (SECOND DATUM) | 8*2 |
| 45 | F => B | 1 |
| 46 | STORE F IN RAM (L12); F => C; DATUM => D | 2 |
| 47 | S => OUT (THIRD DATUM) | 8*2 |
|  | TOTAL | 1758 |
|  | MAXIMUM TIME BETWEEN A PES PACKET AND THE FOLLOWING ONE | 40.000 |

As it may be observed, the time requirements are satisfied because the total number of clock cycles required is less by an order of magnitude than the maximum allowed value (the processing time between a PES packet and the next is of 40,000 cycles. Since the major computing burden is for the acquisition of the PES packet, it may be easily verified that even the highest security levels (3 and 4) satisfy the above mentioned time constraints.

That which is claimed is:

1. A cryptography method for data transmitted via a packet switching network comprising the steps of:

generating at a transmitting station and at a receiving station a chaotic map from a starting key producing dynamically updated key values every predetermined number of processing steps of the chaotic map, the generating comprising generating a sequence of chaotically evolving masking data corresponding to dynamically updated key values to be summed with information data at the transmitting station and to be subtracted from received data at the receiving station, the sequence being performed using a multilevel architecture system with dynamically updated key values output by a level representing an input key of a successive level and so forth until a last level generates the masking data, and independently choosing a chaotic map from among a plurality of chaotic maps and using the independently chosen chaotic maps for adjacent levels;

masking data to be transmitted over the packet switching network using a logic combination with current dynamically updated key values at the transmitting station; and demasking data received from the packet switching network station using a logic decomposition with the current dynamically updated key values.

2. A method according to claim 1, wherein an encrypted data packet comprises a header of constant length and a payload of variable length.

3. A method according to claim 2, wherein the header of the encrypted packet has at least seven fields.

4. A method according to claim 2, wherein the header of the encrypted packet has the following fields:

PID (Packet Identifier) which is an identifier which permits identifying the packet as an encrypted packet;

SID (Stream Identifier) which is an identifier of a stream to which the packet belongs, and which permits implicitly establishing when encrypting of a certain stream should stop and encrypting of another stream should start;

MID (Message Identifier) which is an identifier of a message to which the packet belongs, which permits implicitly establishing when a change of key should be done;

CC (Continuity Counter) which indicates a number of the packet within the message, and which permits, during the reception phase, detecting an eventual loss of packets because during transmission the continuity counter is incremented one unit at a time;

SL (Security Level) which indicates a chosen security level of protection of information;

HL (Header Length) which indicates a length in bytes of a header of the packet of data header contained in the payload, and which for certain types of data will be 0; and PL (Payload Length) which indicates a length in bytes of the payload of the encrypted packet, and which serves to maintain synchronization in case of a loss of encrypted packets.

5. An encryption method for data transmitted via a packet switching network comprising the steps of:

generating at a transmitting station a chaotic map from a starting key producing dynamically updated key values every predetermined number of processing steps, the generating comprising generating a sequence of chaotically evolving masking data corresponding to dynamically updated key values to be summed with information data at the transmitting station, the sequence being performed using a multilevel architecture system with dynamically updated key values output by a level representing an input key of a successive level and so forth until a last level generates the masking data, and independently choosing a chaotic map from among a plurality of chaotic maps and using the independently chosen chaotic maps for adjacent levels; and masking data to be transmitted over the packet switching network using a logic combination with current dynamically updated key values at the transmitting station.

6. A method according to claim 5, wherein an encrypted data packet comprises a header of constant length and a payload of variable length.

7. A method according to claim 6, wherein the header of the encrypted packet has at least seven fields.

8. A decrypting method for data received from a packet switching network comprising the steps of:

generating at a receiving station a chaotic map from a starting key producing dynamically updated key values every predetermined number of processing steps, the generating comprising generating a sequence of chaotically evolving masking data corresponding to dynamically updated key values to be subtracted from received data at the receiving station, the sequence being performed using a multilevel architecture system with dynamically updated key values output by a level representing an input key of a successive level and so forth until a last level generates the masking data, and independently choosing a chaotic map from among a plurality of chaotic maps and using the independently chosen chaotic maps for adjacent levels; and demasking data received from the packet switching network at the receiving station using a logic decomposition with the current dynamically updated key values.

9. A method according to claim 8, wherein an encrypted data packet comprises a header of constant length and a payload of variable length.

10. An encrypted method according to claim 9, wherein the header of the crypted packet has at least seven fields.

* * * * *